(No Model.)
A. P. FOLSOM.
Hold Back Attachment for Harness.
No. 240,989. Patented May 3, 1881.
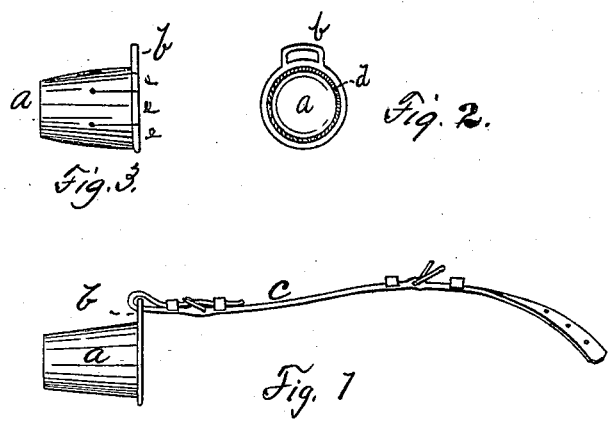

UNITED STATES PATENT OFFICE.

ALBION P. FOLSOM, OF OLDTOWN, MAINE.

HOLDBACK ATTACHMENT FOR HARNESS.

SPECIFICATION forming part of Letters Patent No. 240,989, dated May 3, 1881.

Application filed February 5, 1881. (No model.)

*To all whom it may concern:*

Be it known that I, ALBION P. FOLSOM, of Oldtown, in the county of Penobscot and State of Maine, have invented certain new and useful Improvements in Holdback Attachments for Harness; and I do hereby declare that the following is a full, clear, and exact description of the invention, that will enable others skilled in the art to which it appertains to make and use the same, reference being had to the accompanying drawings, forming a part of this specification, in which—

Figure 1 shows a side view of my invention; Fig. 2, front view of cup with rubber lining; Fig. 3, thimble with spring attachment.

Same letters show like parts.

My invention consists of an improved holdback for vehicles which is so constructed and arranged as to become detached from the carriage by the forward motion of the horse when the tugs are unfastened. It has no connection with the ordinary breeching commonly forming a part of the harness, which breeching may, when my holdback is used, be dispensed with; or my device may be used as auxiliary to the common breeching and holdback as an additional security.

My invention will be readily understood by reference to the accompanying drawings, in which, at $a$, is shown a metallic cup or thimble fitting over the end of the shaft. This cup is provided with a loop, $b$, through which is passed and secured a strap, $c$, extending back and buckled to or around the strap supporting the shaft-lug, or to some convenient part of the saddle or its attachments. The other shaft is, of course, provided with a similar attachment.

When a horse descends a hill the vehicle presses forward and is held off the animal's heels by the shafts secured, as described, to the saddle; or, in case the ordinary holdback is used and gives way, my device holds the vehicle, and in many cases would prove an invaluable security against accident.

When the horse is unharnessed he draws the cups or thimbles from the shafts without the necessity of unbuckling.

My device, moreover, tends to keep the shaft-lug from traveling back and forth on the thill, and guards against the hauling of the vehicle by the shaft-lug instead of the traces, which happens when the lug becomes cramped upon the shaft.

The cup or thimble $a$ may be lined with rubber to prevent noise and wear of the thill, or it may be split, as shown in Fig. 3, and the mouth contracted, either modification forming a spring cup or thimble. The rubber lining is indicated by the letter $d$ and the metallic spring attachment at $e\ e\ e$.

What I claim as my invention is—

1. The improved holdback consisting of the cups or thimbles $a$, adapted to receive the end of the shaft, and straps $c$, for connecting said cups with the saddle or its attachments, substantially as described.

2. In a holdback, the spring cups or thimbles fitting the ends of the shafts or thills, and adapted to be connected by the straps $c$ to the saddle or its attachments, substantially as set forth.

In testimony that I claim the foregoing I have hereunto set my hand this 1st day of February, 1881.

ALBION P. FOLSOM.

Witnesses:
F. H. C. REYNOLDS,
WM. FRANKLIN SEAVEY.